United States Patent [19]

Marshall et al.

[11] Patent Number: 4,800,131

[45] Date of Patent: Jan. 24, 1989

[54] CORED WIRE FILLER METALS AND A METHOD FOR THEIR MANUFACTURE

[75] Inventors: Claire B. Marshall, York; Frank B. Lake, Brodbecks; Roger A. Bushey, Littlestown, all of Pa.

[73] Assignee: Alloy Rods Global, Inc., Hanover, Pa.

[21] Appl. No.: 683,844

[22] Filed: Dec. 20, 1984

[51] Int. Cl.[4] .................................................. B22F 7/08
[52] U.S. Cl. ................................. 428/558; 428/598; 428/561; 419/3
[58] Field of Search ................ 428/548, 558, 561; 449/3, 4; 72/264, 265; 219/146.23

[56] References Cited

U.S. PATENT DOCUMENTS

| | | | |
|---|---|---|---|
| 3,118,053 | 1/1964 | Arikawa et al. | 219/146 |
| 3,147,362 | 9/1964 | Ramsey et al. | 219/146 |
| 3,169,861 | 2/1965 | Ehringer | 75/206 |
| 3,457,388 | 7/1969 | Pokhodnya et al. | 219/146 |
| 4,057,706 | 11/1977 | Tanigaki et al. | 219/146 |
| 4,071,658 | 1/1978 | Phillips et al. | 428/552 X |
| 4,127,700 | 11/1978 | Stockel et al. | 428/555 |
| 4,144,629 | 3/1979 | Phillips et al. | 428/555 X |
| 4,185,136 | 1/1980 | Wasserman et al. | 428/561 |
| 4,205,981 | 6/1980 | Watmough | 75/58 |
| 4,225,768 | 9/1980 | Seifahrt | 219/76.14 |
| 4,394,560 | 7/1983 | Kishida et al. | 219/137 WM |
| 4,396,820 | 8/1983 | Puschner | 219/121 |
| 4,423,119 | 12/1983 | Brown et al. | 428/558 |
| 4,426,428 | 1/1984 | Kammer et al. | 428/561 |
| 4,430,122 | 2/1984 | Pauga | 75/123 B |
| 4,478,787 | 10/1984 | Nadkarni et al. | 428/558 X |

FOREIGN PATENT DOCUMENTS 585019  12/1977  U.S.S.R. .

Primary Examiner—Peter A. Nelson

[57] ABSTRACT

Welding, soldering and brazing and wire filler metals having a metallic sheath enclosing a core wire and, preferably, filler powder materials. The diameter of the composite wire is reduced by drawing, rolling or swaging. The composite wire is easier for filler metal manufacturers to make and can have better operating characteristics leading to improved bead appearance and joint quality.

19 Claims, No Drawings

CORED WIRE FILLER METALS AND A METHOD FOR THEIR MANUFACTURE

This invention relates to cored wire filler metals, i.e., filler metals broadly comprising an outer metallic sheath enclosing a wire within its core, which are useful for various welding, soldering or brazing applications.

Cored wire filler metals have been developed by electrode manufacturers to meet special fabrication and/or application problems. For example, a coextruded alloy having a nominal chemistry of 55% nickel/45% iron is extremely difficult to fabricate into wire but it minimizes overheating during welding compared to a similar wrought product. Cored wire filler metals are also useful because they tend to reduce various production difficulties and costs, allow adjustment of the aim chemical analysis and improve the purity level.

Volatile magnesium alloy wire sheathed in, e.g., steel has manufactured, to improve the recovery of the magnesium a molten metal innoculating technique. See, e.g., U.S. Pat. No. 4,205,981.

The known methods of manufacturing cored wire filler metals generally are costly, impractica or produce a less than desirable product. One such method is characterized by the steps of inserting a metallic billet (such as nickel which has a melting point of 1455° C.) into the hollow core of another billet (of, e.g., steel; iron has a melting point of 1530° C.) and then coextruding the composite. These cored wire filler materials are very costly because the method requires specialized equipment not normally part of a filler metal manufacturer's operations. A second method is characterized by the step of merely inserting a covered core wire into a tube without further reduction in diameter. A third method is characterized by the step of enclosing a metallic strip around powder filler materials. These latter two methods are more practical than is the first method, from a cost viewpoint, but the cored wire filler metals are frequently less than satisfactory. Good electrical contact between the covered core wire and the outer tube is not infrequently lost. Powder filler materials in the core, if present, may segregate or flow which may require the use of binders. Also the ends of cut lengths may have to be crimped, and the surface of continuous lengths may have to be crimped intermittently, to mechanically retain the materials in place. These and other problems result in difficulties in usage, either as a core wire for covered electrodes (shielded metal arc welding electrodes) or as a filler metal in welding, soldering or brazing.

We have discovered an improved method for economically making commercially acceptable cored wire filler metals on conventional production lines using otherwise known techniques of electrode manufacturers. Cored wire filler metals made by our method can have consistently better operating characteristics which leads to better bead appearance and joint quality, and/or are cheaper and easier to manufacture. Our method comprises, in addition to the other conventional production steps, the steps of forming a composite wire by providing a core wire and then deforming a metallic strip into a sheath enclosing the core wire. We preferably then reduce the diameter of the composite wire; and most preferably by reducing the composite's diameter by drawing, rolling or swaging. Also, we preferably enclose powder filler materials along with the wire in the core of the sheath for, inter alia, improving the formability of the composite wires by reducing the slippage beween the wire and sheath during the diameter reducing step.

The sheath may be formed from any suitable ferrous or non-ferrous metal or alloy composition or it may be a bimetallic structure formed from different alloys. Mild steel, which is a conventional material, is frequently suitable. The core wire may be a solid metallic wire, a metallic powder and/or flux cored wire. Also, the core wire may be a multiple of each type of wire and/or a combination of the various types of wires. The powder filler materials are those powders normally added as alloying agents, fluxing agents and slag formers, arc stabilizers, deoxidizers, desulfurizers, denitriders, dephosphorizers or to obtain desired operating characteristics such as reduced spatter, improved bead appearance and the like.

Arc stabilizers useful in our composite wires include materials such as graphite, sodium titanate, potassium titanate, feldspars and the like. Useful slag forming and gas forming materials include such materials as titanium dioxide, silicon dioxide, magnesium oxide, aluminum oxides, carbonates, fluorides and the like. Useful alloying materials include chromium, aluminum, titanium, boron, iron, copper, cobalt, manganese, vanadium, nickel, molybdenum, niobium, tungsten and their alloys. Useful deoxidizing, desulfurizing, and/or denitriding materials include, calcium, titanium, barium, magnesium, aluminum, silicon, zirconium, rare earths and their alloys. Materials such as sodium titanate, silicon carbide, the above-mentioned metallic alloying materials, ferro alloys and the like are also suitable for reducing slippage between the core wire and the sheath during the diameter reducing step.

The cored wire filler metals of our invention are useful as continuous filler metals for a wide variety of uses including gas metal arc, submerged arc, gas tungsten arc, electro gas, electro slag and gas welding processes. Also the composite filler metals may be straightened and cut to length for use in producing covered electrodes or as filler material in gas tungsten arc welding, and gas welding, brazing and soldering processes.

Other details, objects and advantages of our invention will become apparent as the following description of certain examples thereof proceeds.

EXAMPLE 1

Several composite wires having a nominal composition of from 40% to 60% nickel, remainder iron, were made in accordance with our invention. The sheath was formed from a mild steel having dimensions of 0.02×0.5 inches and the core wire was a solid wire comprising 99% nickel. In addition graphite, sodium titanate and silicon carbide were each added in amounts of up to about 3.5 percent by weight of the total wire. Silicon carbide and sodium titanate were added to help in reducing the slippage between the mild steel sheath and the pure nickel core wire. The sodium titanate was also added along with the graphite as an arc stabilizer.

Portions of the composite wire were drawn to 3/32 (a reduction of about 40% in diameter) and ⅛ inches in diameter, straightened, cut to lengths of 9, 12 or 14 inches and extrusion coated with fluxing and alloying materials. The coating contained, based on the total coating weight: 20–50% strontium, calcium and/or barium carbonates; 12–22% calcium and/or strontium fluorides; 7–15% graphite; and 15–50% extrusion aids, aluminum and iron powders. These covered electrodes were tested on ⅛ inch thick grey cast iron using both direct and alternating current. The ⅛ inch diameter electrodes produced satisfactory welds using 90–145 amperes and a constant current three phase welding machine.

Other portions of the composite wire were drawn down to diameters as small as 0.025 inches and tested as gas metal arc welding electrodes using shielding gases such as 98% argon—2% oxygen and 90% helium—7% argon—3% carbon dioxide. The deposit analyses of these electrodes were 40–60% nickel, balance iron. The electrodes having a diameter of 0.045 inches were tested at 200 amperes, 26 volts on grey cast iron using a constant voltage welding machine with some inductance. The welding characteristics of these electrodes were satisfactory.

EXAMPLE 2

Composites comprising a sheath containing filler powder materials and a wire in its core and having a nominal composition of 18% chromium, 8% nickel, balance iron were made in accordance with our invention. A mild steel strip having dimensions of about 0.04×0.6 inches was enclosed about a nickel wire having a 0.06 inch diameter and about 17% granular chromium powder, based upon the total wire weight.

The composite wire was reduced in diameter to ⅛ inches (approximately 45% reduction in diameter), straightened and cut to 14 inch lengths. The 14 inch lengths were then coated with a rutile/feldspar coating along with additional alloying elements. The electrodes gave an arc with a good spread resulting in good slag control and bead shape. The resulting deposit analysis was a nominal 29.5% chromium, 9% nickel stainless steel.

EXAMPLE 3

A composite was produced comprising a pure nickel sheath enclosing an iron wire and powder filler materials in its core. The iron wire was nominally 98% pure and had a diameter of 0.08 inches. The fill materials comprised pure nickel powder and iron powder in a ratio of 4 to 1 and the powder materials comprised about 10% of the total electrode weight.

The composite wire was drawn to an 1/16 inch diameter and tested as a gas metal arc welding electrode using a 98% argon—2% oxygen shielding gas. Testing was done on a standard grey cast iron having a typical carbon content of 3.5% and a silicon content of 2.4% by weight.

The deposit analysis was nominally 45–60% nickel, balance iron.

EXAMPLE 4

A composite comprising a nickel sheath around a solid copper wire and having a nominal composition of 70% nickel—30% copper was made in accordance with our invention. The sheath was formed from a 0.01×0.4 inch 99% nickel strip and the wire was formed from 99% copper stock. Additional filler materials were added for alloying and deoxidation during the welding operation.

Portions of the composite were drawn down to a diameter of 3/32 inch (approximately 32% reduction in diameter) straightened, cut to 9 inch lengths and coated with flux materials comprising cryolite, calcium carbonate, rutile and manganese powder. The finished electrode was then used in a welding test and produced a satisfactory weld.

Portions of the 3/32 inch diameter wire were drawn to a 1/16 inch diameter and successfully tested as a gas metal arc electrode.

EXAMPLE 5

A composite wire comprising a sheath enclosing a metallic powder cored wire having a nominal composition of 37% nickel—30% chromium—33% iron was fabricated in accordance with our invention. The sheath was formed from an AISI Type 404 stainless steel strip having dimensions of 0.01×0.4 inches. The core wire was formed from a nickel strip having dimensions of 0.01×0.4 inches, filled with 98% chromium metal powder, and drawn to a diameter of 0.09 inches (a reduction of about 36% in diameter).

Portions of the composite wire were drawn to 5/64 inch and 1/16 inch in diameter and successfully evaluated as gas metal arc electrodes.

Another portion of the wire was drawn to 3/32 inch diameter, straightened, cut to 12 inch lengths and coated with various fluxing and alloying materials. The electrodes were successfully tested producing a nominal deposit chemistry of 20–23% chromium, 8–10% molybdenum, 17–20% iron, 0.5–2.5% cobalt and 0.2–1.0% tungsten.

EXAMPLE 6

A composite wire having a nominal composition of 1% aluminum, 43% nickel and 56% iron was made of a sheath enclosing a plurality of solid wires and filler materials in the core. The sheath was fabricated from a 0.02×0.5 inch iron strip. The core wires were 0.030 inch diameter aluminum and 0.090 inch diameter nickel wires. Nickel powder fill material was added in an amount up to 12% by weight of the total composite wire.

Portions of the composite wire were drawn to ⅛ (approximately 30% reduction in diameter) and 3/32 inch diameters, straightened, cut to 14 and 9 inch lengths respectively and then coated with a flux comprising strontium carbonate, barium carbonate, nickel powder and graphite. The electrodes were successfully tested with cast iron and produced weld deposits having 45–60% nickel, 0.5–2.0% aluminum, 1–3% carbon, remainder iron.

Other portions of the composite wire were drawn to 0.045 inch diameter and successfully tested on grey cast iron as a gas metal arc welding electrode using 98% argon—2% oxygen gas.

While we have shown and described certain preferred embodiments of our invention, it is to be distinctly understood that the invention is not limited thereto but may be otherwise embodied within the scope of the following claims.

We claim:

1. A method of making a cored wire filler metal comprising the steps of providing a core wire having a chemistry and then deforming a metal strip of a width having a different chemistry into a sheath enclosing the core wire, the sheath having a circumference of less than about 78% of the width of the metal strip.

2. A method of making a cored wire filler metal comprising the steps of forming a composite wire by deforming a metal strip having a chemistry into a sheath enclosing a core wire having a different chemistry and then reducing the diameter of the composite wire.

3. The method of claim 2 wherein the diameter of the composite wire is reduced by drawing.

4. The method of claim 2 wherein the diameter of the composite wire is reduced by rolling.

5. The method of claim 2 wherein the diameter of the composite wire is reduced by swaging.

6. The method of claim 2 wherein the diameter of the composite wire is reduced by at least about 20%.

7. The method of claim 2 wherein the diameter of the composite wire is reduced by at least about 30%.

8. The method of claim 2 wherein the diameter of the composite wire is reduced by at least about 40%.

9. The method of claim 2 wherein the core wire is a solid wire.

10. The method of claim 2 wherein the core wire is a flux cored wire.

11. The method of claim 2 wherein the core wire is a metallic powder cored wire.

12. The method of claim 2 wherein the core wire comprises at least two wires.

13. The method of claim 2 wherein the core wire comprises at least two different kinds of wire.

14. The method of claim 2 wherein the metallic sheath encloses filler powder materials in addition to the wire.

15. The method of claim 2 wherein the metallic sheath encloses arc stabilizers in addition to the wire.

16. The method of claim 2 wherein the metallic sheath encloses alloying powder in addition to the wire.

17. The method of claim 2 wherein the metallic sheath encloses slag forming agents in addition to the wire.

18. The method of claim 2 wherein the metallic sheath encloses a gas forming agent in addition to the wire.

19. The method of claim 2 wherein the metallic sheath encloses deoxidizing, denitriding, desulfurizing, dephosphorizing agents or mixtures thereof.

* * * * *